United States Patent
Resconi et al.

(10) Patent No.: US 6,620,888 B2
(45) Date of Patent: Sep. 16, 2003

(54) THERMOPLASTIC COMPOSITIONS OF ISOTACTIC PROPYLENE POLYMERS AND FLEXIBLE PROPYLENE POLYMERS HAVING REDUCED ISOTACTICITY AND A PROCESS FOR THE PREPARATION THEREOF

(75) Inventors: Luigi Resconi, Ferrara (IT); Angelo Ferraro, Bologna (IT); Giovanni Baruzzi, Ferrara (IT)

(73) Assignee: Basell Polyolefine GmbH, Wesseling (DE)

( * ) Notice: Subject to any disclaimer, the term of this patent is extended or adjusted under 35 U.S.C. 154(b) by 0 days.

(21) Appl. No.: 09/979,471

(22) PCT Filed: May 12, 2001

(86) PCT No.: PCT/EP01/02786
§ 371 (c)(1),
(2), (4) Date: Nov. 20, 2001

(87) PCT Pub. No.: WO01/70878
PCT Pub. Date: Sep. 27, 2001

(65) Prior Publication Data
US 2002/0198336 A1 Dec. 26, 2002

(30) Foreign Application Priority Data
Mar. 22, 2000 (EP) .............................. 00201056

(51) Int. Cl.⁷ .................... C08L 23/00; C08L 23/04; C08L 23/10; C08L 45/00; C08F 10/06
(52) U.S. Cl. ................. 525/210; 525/216; 525/232; 525/240; 525/241
(58) Field of Search ............... 525/210, 216, 525/232, 240, 241

(56) References Cited

U.S. PATENT DOCUMENTS

| | | | |
|---|---|---|---|
| 4,298,718 A | 11/1981 | Mayr et al. | 526/124 |
| 4,495,338 A | 1/1985 | Mayr et al. | 526/125 |
| 4,521,566 A | 6/1985 | Galli et al. | 525/247 |
| 5,239,022 A | 8/1993 | Winter et al. | 526/127 |
| 5,539,056 A | 7/1996 | Yang et al. | 525/240 |
| 5,589,549 A | 12/1996 | Govoni et al. | 525/247 |
| 5,648,422 A | 7/1997 | Collina et al. | 525/52 |
| 5,834,562 A * | 11/1998 | Silvestri et al. | 525/240 |
| 6,037,417 A | 3/2000 | Nguyen et al. | 525/240 |
| 6,248,829 B1 | 6/2001 | Fischer et al. | 525/191 |
| 6,376,613 B1 * | 4/2002 | Pelliconi et al. | 525/240 |

FOREIGN PATENT DOCUMENTS

| | | |
|---|---|---|
| EP | 0361493 | 4/1990 |
| EP | 0395083 | 10/1990 |
| EP | 0485820 | 5/1992 |
| EP | 0553806 | 8/1993 |
| EP | 0604908 | 7/1994 |
| EP | 0943631 | 9/1999 |
| WO | 9200333 | 1/1992 |
| WO | 9622995 | 8/1996 |
| WO | 9940129 | 8/1999 |
| WO | 0001738 | 1/2000 |
| WO | 0147939 | 7/2001 |

OTHER PUBLICATIONS

U. Dietrich et al., J. Am. Chem. Soc., 121: 4348–4355 (1999).

* cited by examiner

*Primary Examiner*—Nathan M. Nutter

(57) ABSTRACT

Described is a thermoplastic composition including:
(A) 10 to 99% by weight of a propylene polymer optionally containing from 0.1 to 5% by moles of units derived from an olefin of the formula $CH_2=CHR$, R being hydrogen, a $C_2$–$C_{20}$-alkyl or a $C_6$–$C_{12}$-aryl group, having the following characteristics:
  50<isotactic triads (mm)<85;
  melting point (Tm) from 60° C. to 120° C., and
(B) 1 to 90% by weight of a propylene polymer having an essentially isotactic structure, optionally containing from 0.1 to 5% by moles of units derived from an olefin of the formula $CH_2=CHR$, R being hydrogen, a $C_2$–$C_{20}$-alkyl or a $C_6$–$C_{12}$-aryl group, which has a melting point (Tm) higher than 153° C. Also described is a process for the preparation of this thermoplastic composition.

25 Claims, No Drawings

THERMOPLASTIC COMPOSITIONS OF ISOTACTIC PROPYLENE POLYMERS AND FLEXIBLE PROPYLENE POLYMERS HAVING REDUCED ISOTACTICITY AND A PROCESS FOR THE PREPARATION THEREOF

The present invention relates to thermoplastic polymer compositions, particularly to thermoplastic compositions containing isotactic polypropylene and a flexible propylene polymer having reduced isotacticity and to a process for the preparation thereof. The invention relates also to manufactured articles obtainable from those compositions.

Isotactic polypropylene is usually obtained by using Ziegler-Natta catalysts, that produce highly isotactic polymers with a broad distribution of molecular weight. More recently metallocene-based catalysts have been used in the polymerization reaction of olefins. Operating in the presence of these catalysts, polymers characterised by a narrow molecular weight distribution and having structural characteristics of interest have been obtained. By polymerizing propylene in the presence of metallocene catalysts, amorphous or highly crystalline polypropylenes can be obtained depending on the metallocene used, such as for example as described in EP 604 908 and EP 485 820. Amorphous polypropylene shows a poor stiffness, while the highly stereoregular and crystalline polypropylene thus obtained is characterised by good stiffness, but is unsatisfactory when high flexibility is required.

Several attempts have been made to improve the elastic properties of isotactic polypropylene by blending it with a "softer" polymer. For example in U.S. Pat. No. 4,521,566 polypropylene compositions are prepared in a multistage process which comprises at least one stage of propylene homopolymerization and at least one stage of ethylene/propylene copolymerization in the presence, in both stages, of a catalyst comprising a compound of titanium supported on a magnesium halide in active form. U.S. Pat. No. 5,539,056 describes a blend of high molecular weight amorphous polypropylene with low molecular weight isotactic polypropylene.

In U.S. Pat. No. 5,589,549 and U.S. Pat. No. 5,648,422 there are described multistep processes wherein in a first step a porous isotactic polypropylene is prepared in the presence of a titanium-based catalyst. In a second step, in the presence of the said porous polymer and a metallocene-based catalyst one or more olefins are polymerized.

Compositions of propylene polymers have now been found which show an improved balance of flexible-mechanical properties. Thus, according to a first aspect of the present invention, it is provided a thermoplastic composition comprising:
(A) 10 to 99% by weight of a propylene polymer optionally containing from 0.1 to 5% by moles of units deriving from an olefin of formula $CH_2=CHR$, R being hydrogen, a $C_2$–$C_{20}$-alkyl or a $C_6$–$C_{12}$-aryl group, having the following characteristics:
50<isotactic triads (mm)<85;
melting point (Tm) from 60° C. to 120° C.; and
(B) 1 to 90% by weight of a propylene polymer optionally containing from 0.1 to 5% by moles of units deriving from an olefin of formula $CH_2=CHR$, R being hydrogen, a $C_2$–$C_{20}$-alkyl or a $C_6$–$C_{12}$-aryl group, having the following characteristic:
an essentially isotactic structure;
melting point (Tm) higher than 153° C.
The ratio of the quantities by weight of the components (A)/(B) of the composition according to the present invention is preferably comprised from 30:70 to 95:5, still more preferably from 40:60 to 90:10.

Preferably the polymer used as component (A) has a melting enthalpy<70 J/g.

Preferably, the melting point (Tm) of the propylene polymer used as component (B) is higher than 155° C., most preferably higher than 160° C.

It has been observed that the compositions according to the present invention have very good flexible-mechanical properties, even under high deformation, which are remarkably improved as compared to those of the single component. These elastic properties are reflected in improved impact strength. Thus, the compositions of the present invention are particularly useful for the manufacture of articles for which a high mechanical strength is required.

Propylene polymers that can be used as component (A) in the composition of the present invention as well as a process for the preparation thereof are described, for example, by U. Dietrich et al, in J. Am. Chem. Soc. 1999, 121, 4348–4355, the contents of which are to be incorporated by reference in the present description.

A particular useful method for obtaining the propylene polymer of component (A) of the composition of the present invention is described in the copending Application PCT/EP00/3191 in the name of the same Applicant.

The propylene polymers of component (A) have low crystallinity. Their melting enthalpy values (ΔHf) are preferably lower than <70 J/g. Their intrinsic viscosity values [η] are preferably higher than 0.5, more preferably higher than 0.8.

Preferably the propylene polymer of component (A) has a melting point (Tm) of from 80° C. to 120° C.

$^{13}$C-NMR analysis carried out on the above propylene polymer as used in component (A) of the composition of the present invention provides information on the tacticity of the polymer chains. It is observed that the percentage of isotactic triads (mm) is from 50 to 85. Preferably in the propylene polymer the isotactic triads (mm) satisfy the relation 60<isotactic triads (mm)<80.

The molecular weights of the above propylene polymers are distributed within fairly narrow ranges. Thus the molecular weight distribution $M_w/M_n$ turns out to be generally lower than 5, preferably lower than 4, more preferably lower than 3.

Examples of isotactic polymers of propylene for use as component (B) are commercially available isotactic polypropylenes, which are produced by means of conventional titanium based heterogeneous Ziegler-Natta-type catalysts. Metallocene based isotactic polymers having the above-described characteristics can also be used. Suitable metallocenes of this type are described in WO 96/22995. Polymers made by means of metallocenes generally have narrow molecular weight distribution $M_w/M_n$, such as values of lower than 3.

Generally the essentially isotactic propylene polymer used as component (B) of the compositions of the present invention have the following characteristics:
melting enthalpy>70 J/g, and
% of isotactic triads mm (B)>% of isotactic triads mm (A).

The structure of the above propylene polymer used as component (B) in the thermoplastic composition according to the present invention is essentially isotactic. In fact the percentage of isotactic triads (mm) is preferably higher than 90, more preferably the percentage of isotactic triads (mm) is higher than 95.

The essentially isotactic propylene polymer used in component (13) of the composition of the present invention have intrinsic viscosity values [η] of preferably higher than 1 dl/g. The propylene polymer as used as components (A) and (B) in the composition of the present invention can contain co-monomer units, such as ethylene, 1-butene, styrene, 1,5-hexadiene, 4-methylpentene or allyltrimethylsilane.

In the thermoplastic composition according to the present invention, the melting enthalpy ΔH in the melting range of from about 39° C. to about 130° C. is generally higher than 6 J/g, preferably higher than 20 J/g. The thermoplastic composition according to the present invention can contain additives which are conventionally employed in thermoplastic polymer compositions such as stabilisers, antioxidants, corrosion inhibitors and the like.

Moreover, the compositions of the present invention can contain inorganic, organic or polymeric fillers. The above additives and fillers can be used in conventional quantities, as is known to those skilled in the art. Generally said additives and fillers can be present in a quantity of 5% by weight of the overall composition. Another aspect of the present invention is a process for the preparation of a thermoplastic composition as defined above, comprising the steps:

(I) polymerizing propylene optionally with an olefin of the formula $CH_2=CHR$, R being hydrogen, a $C_1$–$C_{20}$-alkyl or a $C_6$–$C_{12}$-aryl group, in one or more reactors, in the presence of a catalyst comprising the product between an Al-alkyl compound and a solid component comprising at least one non-metallocene compound of a transition metal $M^1$ containing Ti and not containing $M_1$-π bonds and a magnesium halide;

(II) optionally deactivating the catalyst used under (I) and contacting the product as obtained under step (I) with (A) a metallocene compound of the general formula (I):

$$L^1Z^1G^1M^2X^1p \qquad (I)$$

wherein $L^1$ is a divalent bridging group;
$Z^1$ is a moiety of formula (II):

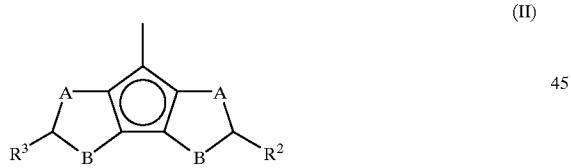

(II)

wherein $R^2$ and $R^3$, same or different from each other, are selected from hydrogen, a $C_1$–$C_{20}$-alkyl, $C_3$–$C_{20}$-cycloalkyl, $C_2$–$C_{20}$-alkenyl, $C_6$–$C_{20}$-aryl, $C_7$–$C_{20}$-alkylaryl, $C_7$–$C_{20}$-arylalkyl radical, optionally containing heteroatoms belonging to groups 13–17 of the Periodic Table of the Elements, preferably at least one of $R^2$ and $R^3$ being different from hydrogen;

A and B are selected from S, O or $CR^4$, wherein $R^4$ is selected from hydrogen, a $C_1$–$C_{20}$-alkyl, $C_3$–$C_{20}$-cycloalkyl, $C_2$–$C_{20}$-alkenyl, $C_6$–$C_{20}$a-aryl, $C_7$–$C_{20}$-alkylaryl, $C_7$–$C_{20}$-arylalkyl radical, optionally containing heteroatoms belonging to groups 13–17 of the Periodic Table of the Elements, either A or B being different from $CR^5$, and wherein the rings containing A and B have a double bond in any of the allowed positions;

$G^1$ is a moiety of formula (III):

(III)

wherein $R^5$, $R^6$, and $R^8$, same or different from each other, are selected from hydrogen, a $C_1$–$C_{20}$-alkyl, $C_3$–$C_{20}$-cycloalkyl, $C_2$–$C_{20}$-alkenyl, $C_6$–$C_{20}$-aryl, $C_7$–$C_{20}$-alkylaryl, $C_7$–$C_{20}$-arylalkyl radical, optionally containing heteroatoms belonging to groups 13–17 of the Periodic Table of the Elements, and $R^5$ and le can form a ring comprising from 3 to 8 atoms, which can bear substituents;

$M^2$ is an atom of a transition metal selected from those belonging to group 3, 4, 5, and 6 or to the lanthanide or actinide groups in the Periodic Table of the Elements (IUPAC), $X^1$, same or different, is selected from hydrogen, a halogen atom, a $R^9$, $OR^9$, $OSO_2CF_3$, $OCOR^9$, $SR^9$, $NR^9_2$ or $PR^9_2$ group, wherein the substituents $R^9$ are selected from hydrogen, a $C_1$–$C_{20}$-alkyl, $C_3$–$C_{20}$-cycloalkyl, $C_2$–$C_{20}$-alkenyl, $C_6$–$C_{20}$-aryl, $C_7$–$C_{20}$-alkylaryl, $C_7$–$C_{20}$-arylalkyl radical, optionally containing heteroatoms;

p is an integer of from 0 to 3, being equal to the Oxidation State of the metal M minus 2; and/or with (A') a metallocene compound of the general formula (IV):

$$L^2G^2Z^2M^3X^2q \qquad (IV)$$

wherein;
$G^2$ is a moiety of formula (V);

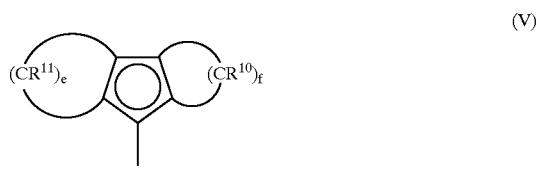

(V)

wherein
the ring substituted with $R^{11}$ and $R^{10}$ groups have double bonds in any of the allowed positions;

$R^{10}$ and $R^{11}$, same or different from each other, are selected from hydrogen, a $C_1$–$C_{20}$-alkyl, $C_3$–$C_{20}$-cycloalkyl, $C_2$–$C_{20}$-alkenyl, $C_6$–$C_2$-aryl, $C_7$–$C_{20}$-alkylaryl, $C_7$–$C_{20}$-arylalkyl radical, optionally containing heteroatoms, wherein two $R^{10}$ and/or $R^{11}$ can form a ring comprising 4 to 8 atoms, which can bear substituents;

e and f, same or different from each other, are integers comprised from 1 to 6; preferably comprised from 2 to 5 more preferably from 3 to 4; and $Z^2$ is a moiety of formula (VI):

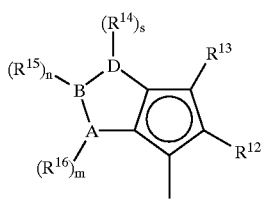

(VI)

wherein
- A, B and D, same or different from each other, are selected from an element of the groups 13 to 16 of the Periodic Table of the Elements (IUPAC);
- $R^{12}$, $R^{13}$, $R^{14}$, $R^{15}$ and $R^{16}$, same or different from each other, are selected from hydrogen, a $C_1$–$C_{20}$-alkyl, $C_3$–$C_{20}$-cycloalkyl, $C_2$–$C_{20}$-alkenyl, $C_6$–$C_{20}$-aryl, $C_7$–$C_{20}$-alkylaryl, $C_7$–$C_{20}$-arylalkyl radical, optionally containing heteroatoms; wherein two $R^{14}$ can form a ring comprising 4 to 8 atoms, and any of two adjacent $R^{14}$, $R^{15}$ and $R^{16}$ can form a ring comprising 4 to 8 atoms, which can bear substituents;
- n, m and s are selected from 0, 1 and 2;
- n, m and s being 0 when A, B and D are selected from an element of the group 16 of the Periodic Table of the Elements (IUPAC);
- n, m and s being 1 when A, B and D are selected from an element of the groups 13 and 15 of the Periodic Table of the Elements (IUPAC);
- n, m and s being 1 or 2 when A, B and D are selected from an element of the group 14 of the Periodic Table of the Elements (IUPAC);
- and wherein the ring containing A, B and D can have double bonds in any of the allowed positions;

or $Z^2$ is a moiety of formula (VII):

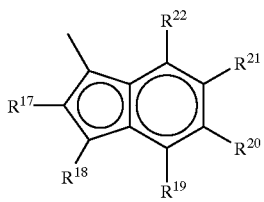

(VII)

wherein
- $R^{17}$, $R^{18}$, $R^{19}$, $R^{20}$, $R^{21}$ and $R^{22}$, same or different from each other, are selected from hydrogen, a $C_1$–$C_{20}$-alkyl, $C_3$–$C_{20}$-cycloalkyl, $C_2$–$C_{20}$-alkenyl, $C_6$–$C_{20}$-aryl, $C_7C_{20}$alkylaryl, $C_7$–$C_{20}$-arylalkyl radical, optionally containing heteroatoms, optionally any of two adjacent $R^{19}$, $R^{20}$, $R^{21}$ and $R^{22}$ can form a ring comprising 4 to 8 atoms which can bear substituents.
- $L^2$ is a divalent bridging group;
- $M^3$ is an atom of a transition metal selected from those belonging to group 3, 4, 5, and 6 or to the lanthanide or actinide groups in the Periodic Table of the Elements (IUPAC),
- $X^2$, same or different, is a hydrogen atom, a halogen atom, a $R^{23}$, $OR^{23}$, $OSO_2CF_3$, $OCOR^{23}$, $SR^{23}$, $NR^{23}_2$ or $PR^{23}_2$ group, wherein the substituents $R^{23}$ are selected from hydrogen, a $C_1$–$C_{20}$-alkyl, $C_3$–$C_{20}$-cycloalkyl, $C_2$–$C_{20}$-alkenyl, $C_6$–$C_{20}$-aryl, $C_7$–$C_{20}$-alkylaryl, $C_7$–$C_{20}$-arylalkyl radical, optionally containing heteroatoms;
- q is an integer of from 0 to 3, being equal to the Oxidation State of the metal M minus 2; and (B) optionally a suitable cocatalyst and/or an Al-alkyl compound;

(III) polymerizing propylene optionally with one or more of an olefin of formula $CH_2$=CHR, R being hydrogen, a $C_1$–$C_{20}$-alkyl or a $C_6$–$C_{12}$-aryl group, in one or more reactors, in the presence of the product obtained in step (II).

The transition metals $M^2$ and $M^3$ are preferably selected from titanium, zirconium and hafnium. The $X^1$ and $X^2$ substituents are preferably chlorine atoms or methyl groups. Preferably the bridging groups $L^1$ and $L^2$ are a >$CMe_2$ or >$SiMe_2$ group.

When a metallocene compound of formula (I) containing a moiety of formula (III) is used, preferably $R^5$ and $R^8$, same or different from each other, are selected from hydrogen, a $C_1$–$C_{20}$-alkyl, $C_3$–$C_{20}$-cycloalkyl, $C_2$–$C_{20}$-alkenyl, $C_6$–$C_{20}$-aryl, $C_7$–$C_{20}$-alkylaryl, $C_7$–$C_{20}$-arylalkyl radical, optionally containing heteroatoms belonging to groups 13–17 of the Periodic Table of the Elements; $R^6$ is selected from a $C_7$–$C_{20}$-alkylaryl or a $QR^{24}R^{25}R^{26}$ group, wherein Q is selected from C, Si, Ge; $R^{14}$, $R^{25}$ and $R^{26}$, same or different from each other, are hydrogen, $C_1$–$C_{20}$-alkyl, $C_3$–$C_{20}$-cycloalkyl, $C_2$–$C_{20}$-alkenyl, $C_6$–$C_{20}$-aryl, $C_7$–$C_{20}$-alkylaryl, $C_7$–$C_{20}$-arylalkyl radicals, optionally containing heteroatoms belonging to groups 13–17 of the Periodic Table of the Elements, with the proviso that when Q is a carbon atom, at least one of $R^{26}$, $R^{27}$ and $R^{28}$ is a hydrogen atom.

Particularly preferred metallocenes of the above mentioned class are those wherein $R^6$ is selected from a $CHR^{24}R^{25}$ group and a $SiR^{24}R^{25}R^{26}$ group, $R^{24}$, $R^{25}$ and $R^{26}$ being hydrogen or $C_1$–$C_{20}$-alkyl groups.

Most preferred are those metallocene wherein $QR^{24}R^{25}R^{26}$ is an isopropyl or a trimethylsilyl group.

Another preferred structure of the moiety of formula (III) is a moiety of formula (IIIa)

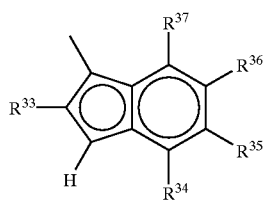

(IIIa)

wherein $R^{33}$, $R^{34}$ $R^{35}$, $R^{36}$ and $R^{37}$ same or different from each other, are selected from hydrogen, a $C_1$–$C_{20}$-alkyl, $C_3$–$C_{20}$-cycloalkyl, $C_2$–$C_{20}$-alkenyl, $C_6$–$C_{20}$-aryl, $C_7$–$C_{20}$alkylaryl, $C_7$–$C_{20}$-arylalkyl radical, optionally containing heteroatoms, optionally any of two adjacent $R^{34}$, $R^{35}$, $R^{36}$ and $R^{37}$ can form a ring comprising 4 to 8 atoms which can bear substituents;

preferably $R^{33}$ is $C_1$–$C_{20}$-alkyl, more preferably is methyl; $R^{37}$ is preferably $C_1$–$C_{20}$-alkyl, $C_6$–$C_{20}$-aryl or can form with $R^{36}$ a condensed benzene ring.

Preferably in the metallocene compound of formula (I) one of A and B is a sulphur atom and the other is a CH group; more preferably A is sulphur. Preferably $R^2$ and $R^3$ are the same and are selected from a $C_1$–$C_{20}$-alkyl group, which can contain a silicon atom. Most preferably $R^2$ and $R^3$ are a methyl or a trimethylsilyl radical.

Non-limiting examples of metallocene compounds of formula (I) useful in the process of the present invention are: methylene(3-methyl-cyclopentadienyl)-7-(2,5-dimethylcyclopentadienyl-[1,2-b:4,3-b']dithiophene) zirconium dichloride and dimethyl;

methylene(3-ethyl-cyclopentadienyl)-7-(2,5-dimethylcyclopentadienyl-[1,2-b:4,3-b']dithiophene)zirconium dichloride and dimethyl;

methylene(3-isopropyl-cyclopentadienyl)-7-(2,5-dimethylcyclopentadienyl-[1,2-b:4,3-b']dithiophene)zirconium dichloride and dimethyl;

methylene(2,4-dimethyl-cyclopentadienyl)-7-(2,5-dimethylcyclopentadienyl-[1,2-b:4,3-b']dithiophene)zirconium dichloride and dimethyl;

methylene(2,4-diethyl-cyclopentadienyl)-7-(2,5-dimethylcyclopentadienyl-[1,2-b:4,3-b']dithiophene)zirconium dichloride and dimethyl;

methylene(2,4-diisopropyl-cyclopentadienyl)-7-(2,5-dimethylcyclopentadienyl-[1,2-b:4,3-b']dithiophene)zirconium dichloride and dimethyl;

methylene(2,3,5-trimethyl-cyclopentadienyl)-7-(2,5-dimethylcyclopentadienyl-[1,2-b:4,3-b']dithiophene)zirconium dichloride and dimethyl;

methylene(2,3,5-triethyl-cyclopentadienyl)-7-(2,5-dimethylcyclopentadienyl-[1,2-b:4,3-b']dithiophene)zirconium dichloride and dimethyl;

methylene(2,3,5-triisopropyl-cyclopentadienyl)-7-(2,5-dimethylcyclopentadienyl-[1,2-b:4,3-b']dithiophene)zirconium dichloride and dimethyl;

methylene(3-cyclohexyl-cyclopentadienyl)-7-(2,5-dimethylcyclopentadienyl-[1,2-b:4,3-b']dithiophene)zirconium dichloride and dimethyl;

methylene-1-(tetrahydroindenyl)7-(2,5-dimethylcyclopentadienyl-[1,2-b:4,3-b']dithiophene)zirconium dichloride and dimethyl;

isopropylidene(3-methyl-cyclopentadienyl)-7-(2,5-dimethylcyclopentadienyl-[1,2-b:4,3-b']dithiophene)zirconium dichloride and dimethyl;

isopropylidene(3-ethyl-cyclopentadienyl)-7-(2,5-dimethylcyclopentadienyl-[1,2-b:4,3-b']dithiophene)zirconium dichloride and dimethyl;

isopropylidene(3-isopropyl-cyclopentadienyl)-7-(2,5-dimethylcyclopentadienyl-[1,2-b:4,3-b']dithiophene)zirconium dichloride and dimethyl;

isopropylidene(3-phenyl-cyclopentadienyl)-7-(2,5-dimethylcyclopentadienyl-[1,2-b:4,3-b']dithiophene)zirconium dichloride and dimethyl;

isopropylidene(2,4-dimethyl-cyclopentadienyl)-7-(2,5-dimethylcyclopentadienyl-[1,2-b:4,3-b']dithiophene)zirconium dichloride and dimethyl;

isopropylidene(2,4-dimethyl-cyclopentadienyl)-7-(2,5-ditrimethylsilylcyclopentadienyl-[1,2-b:4,3-b']dithiophene)zirconium dichloride and dimethyl;

isopropylidene(2,4-diethyl-cyclopentadienyl)-7-(2,5-dimethylcyclopentadienyl-[1,2-b:4,3-b']dithiophene)zirconium dichloride and dimethyl;

isopropylidene(2,4-diisopropyl-cyclopentadienyl)-7-(2,5-dimethylcyclopentadienyl-[1,2-b:4,3-b']dithiophene)zirconium dichloride and dimethyl;

isopropylidene(2-methyl-4-phenyl-cyclopentadienyl)-7-(2,5-dimethylcyclopentadienyl-[1,2-b:4,3-b']dithiophene)zirconium dichloride and dimethyl;

isopropylidene(2-methyl-4-phenyl-cyclopentadienyl)-7-(2,5-ditrimethylsilylcyclopentadienyl-[1,2-b:4.3-b']dithiophene)zirconium dichloride and dimethyl;

isopropylidene(2-methyl-4-isopropyl-cyclopentadienyl)-7-(2,5-dimethylcyclopentadienyl-[1,2-b:4,3-b']dithiophene)zirconium dichloride and dimethyl;

isopropylidene(2,3,5-trimethyl-cyclopentadienyl)-7-(2,5-dimethylcyclopentadienyl-[1,2-b:4,3-b']dithiophene)zirconium dichloride and dimethyl;

isopropylidene(2,3,5-triethyl-cyclopentadienyl)-7-(2,5-dimethylcyclopentadienyl-[1,2-b:4,3-b']dithiophene)zirconium dichloride and dimethyl;

isopropylidene(2,3,5-triisopropyl-cyclopentadienyl)-7-(2,5-dimethylcyclopentadienyl-[1,2-b:4,3-b']dithiophene)zirconium dichloride and dimethyl;

isopropylidene(3-cyclohexyl-cyclopentadienyl)-7-(2,5-dimethylcyclopentadienyl-[1,2-b:4,3-b']dithiophene)zirconium dichloride and dimethyl;

isopropylidene(3-isopropyl-cyclopentadienyl)-7-(2,5-ditrimethylsilylcyclopentadienyl-[1,2-b:4,3-b']dithiophene)zirconium dichloride and dimethyl;

isopropylidene(3-isopropyl-cyclopentadienyl)-4-(2,6-dimethylcyclopentadienyl-[2,1-b:3,4-b']dithiophene)zirconium dichloride and dimethyl;

isopropylidene-1-(tetrahydroindenyl)-7-(2,5-dimethylcyclopentadienyl-[1,2-b:4,3-b']dithiophene)zirconium dichloride and dimethyl;

isopropylidene(3-methyl-cyclopentadienyl)-4-(2,6-dimethylcyclopentadienyl-[2,1-b:3,4-b']dithiophene)hafnium dichloride and dimethyl;

dimethylsilandiyl(3-methyl-cyclopentadienyl)-7-(2,5-dimethylcyclopentadienyl-[1,2-b:4,3-b']dithiophene)zirconium dichloride and dimethyl;

dimethylsilandiyl(3-ethyl-cyclopentadienyl)-7-(2.5-dimethylcyclopentadienyl-[1,2-b:4,3-b']dithiophene)zirconium dichloride and dimethyl;

dimethylsilandiyl(3-isopropyl-cyclopentadienyl)7-(2,5-dimethylcyclopentadienyl-[1,2-b:4,3-b']dithiophene)zirconium dichloride and dimethyl;

dimethylsilandiyl(3-phenyl-cyclopentadienyl)-7-(2,5-dimethylcyclopentadienyl-[1,2-b:4,3-b']dithiophene)zirconium dichloride and dimethyl;

dimethylsilandiyl(2,4-dimethyl-cyclopentadienyl)-7-(2,5-dimethylcyclopentadienyl-[1,2-b:4,3-b') dithiophene)zirconium dichloride and dimethyl;

dimethylsilandiyl(2,4-diethyl-cyclopentadienyl)-7-(2,5-dimethylcyclopentadienyl-[1,2-b:4,3-b']dithiophene)zirconium dichloride and dimethyl;

dimethylsilandiyl(2,4-diisopropyl-cyclopentadienyl)-7-(2,5-dimethylcyclopentadienyl-[1,2-b:4,3-b']dithiophene)zirconium dichloride and dimethyl;

dimethylsilandiyl(2,3,5-trimethyl-cyclopentadienyl)-7-(2,5-dimethylcyclopentadienyl-[1,2-b:4,3-b']dithiophene)zirconium dichloride and dimethyl;

dimethylsilandiyl(2,3,5-triethyl-cyclopentadienyl)-7-(2,5-dimethylcyclopentadienyl-[1,2-b:4,3-b']dithiophene)zirconium dichloride and dimethyl;

dimethylsilandiyl(2,3,5-triisopropyl-cyclopentadienyl)-7-(2,5-dimethylcyclopentadienyl-[1,2-b:4,3-b']dithiophene)zirconium dichloride and dimethyl;

dimethylsilandiyl(3-cyclohexyl-cyclopentadienyl)-7-(2,5-dimethylcyclopentadienyl-[1,2-b:4,3-b']dithiophene)zirconium dichloride and dimethyl;

dimethylsilandiyl(3-trimethylsilyl-cyclopentadienyl)-7-(2,5-dimethylcyclopentadienyl-[1,2-b:4,3-b']dithiophene)zirconium dichloride and dimethyl;

dimethylsilandiyl-1-(indenyl)-7-(2,5-dimethylcyclopentadienyl-[1,2-b:4,3-b']dithiophene)zirconium dichloride and dimethyl;

dimethylsilandiyl-1-(2-methyl-indenyl)-7-(2,5-dimethylcyclopentadienyl-[1,2-b:4,3-b']dithiophene)zirconium dichloride and dimethyl;

dimethylsilandiyl-1-(2-ethyl-indenyl)-7-(2,5-dimethylcyclopentadienyl-[1,2-b:4,3-b']dithiophene)zirconium dichloride and dimethyl;

dimethylsilandiyl-1-(2-isopropyl-indenyl)-7-(2,5-dimethylcyclopentadienyl-[1,2-b:4,3-b']dithiophene)zirconium dichloride and dimethyl;

dimethylsilandiyl-1-(2-isopropyl-indenyl)-4(2,6-dimethylcyclopentadienyl-[2,1-b:3,4-b']dithiophene)zirconium dichloride and dimethyl;

dimethylsilandiyl-1-(2-isopropyl-indenyl)7-(2,5-ditrimethylsilylcyclopentadienyl-[1,2-b:4,3-b']dithiophene)zirconium dichloride and dimethyl;

dimethylsilandiyl-1-(2-methyl-indenyl)-7-(2,5-dimethylcyclopentadienyl-[1,2-b:4,3-b']dithiophene) hafnium dichloride and dimethyl;

dimethylsilandiyl-1-(tetrahydroindenyl)-7-(2,5-dimethylcyclopentadienyl-[1,2-b:4,3-b']dithiophene) zirconium dichloride and dimethyl;

isopropylidene(3-isopropyl-cyclopentadienyl)-7-(2,5-dimethyl-cyclopentadienyl-[1,2-b:4,3-b']dithiophene) zirconium dichloride;

isopropylidene(3-methyl-cyclopentadienyl)-7-(2,5-dimethyl-cyclopentadienyl-[1,2-b:4,3-b']-dithiophene) zirconium dichloride;

isopropylidene(3-isopropyl-cyclopentadienyl)-7-(2,5-ditrimethylsilyl-cyclopentadienyl-[1,2-b:4,3-b']-dithiophene)zirconium dichloride;

isopropylidene(3-isopropyl-cyclopentadienyl)-4-(2,6-dimethyl-cyclopentadienyl-[2,1-b:3,4-b']-dithiophene) zirconium dichloride;

dimethylsilandiyl-1-(indenyl)-7-(2,5-dimethyl-cyclopentadienyl-[1,2-b:4,3-b']-dithiophene)zirconium dichloride;

isopropylidene(2-methyl-4-phenyl-cyclopentadienyl)-7-(2,5-dimethyl-cyclopentadienyl-[1,2-b:4,3-b']-dithiophene) zirconium dichloride;

isopropylidene(2,4-dimethyl-cyclopentadienyl)-7-(2,5-dimethyl-cyclopentadienyl-[1,2-b:4,3-b']-dithiophene) zirconium dichloride;

isopropylidene(3-methyl-cyclopentadienyl)-7-(2,5-dimethyl-cyclopentadienyl-[1,2-b:4,3-b']-dithiophene) hafnium dichloride;

isopropylidene(3-isopropyl-cyclopentadienyl)-7-(2,5-ditrimethylsilyl-cyclopentadienyl-[1,2-b:4,3-b']-dithiophene)zirconium dichloride;

isopropylidene(3-isopropyl-cyclopentadienyl)-4-(2,6-dimethyl-cyclopentadienyl-[2,1-b:3,4-b']-dithiophene) zirconium dichloride.

Preferably dimethylsilandiyl-1-(2-methyl-indenyl)-7-(2,5-dimethylcyclopentadienyl-[1,2-b:4,3-b']dithiophene) zirconium dichloride and dimethylsilandiyl-1-(indenyl)-7-(2,5-dimethylcyclopentadienyl-[1,2-b:4,3-b']dithiophene) zirconium dichloride, dimethylsilandiyl-1-(2-methyl-benz[e]indenyl)-7-(2,5-dimethylcyclopentadienyl-[1,2-b:4,3-b'] dithiophene)zirconium are used.

When a metallocene of the formula (IV) is used in the process of the present invention $G^2$ is preferably a fluorenyl or substituted fluorenyl radical.

Preferably in the moiety of formula (VI) $R^{12}$ is a $C_1$–$C_{20}$-alkyl radical, $R^{14}$ is a $C_6$–$C_{20}$-aryl radical, $R^{13}$, $R^{15}$ and $R^{16}$ are hydrogen, A and B are carbon atoms and D is nitrogen.

Preferably in the moiety of formula (VII) $R^{19}$ and $R^{20}$ form a ring comprising 6 carbon atoms, for example a benz[e]indenyl or a cyclohexaindenyl moiety, or $R^{20}$ and $R^{22}$ form a ring comprising 5 carbon atoms.

Non-limiting examples of metallocenes of formula (IV) useful in the process of the present invention are:

[1-(9-$\eta^5$-fluorenyl)-2-(2-methylbenz[e]-1-$\eta^5$-indenyl) ethane]-zirconium dichloride and dimethyl;

[1-(9-$\eta^5$-fluorenyl)-2-(4,5-cyclohexa-2-methyl-1-$\eta^5$-indenyl)ethane]-zirconium dichloride and dimethyl;

[1-(9-$\eta^5$-fluorenyl)-2-(5,6-cyclopenta-2-methyl-1-indenyl) ethane]-zirconium dichloride and dimethyl.

Metallocenes of the above type and their preparation are described, for example, in U. Dietrich et al., J. Am. Chem. Soc. 1999, 121, 4348–4355.

Non-limiting examples of metallocene compounds of the formula (IV) containing a moiety of formula (VI) are:

dimethylsilandiyl-4-(3-methyl-1-phenylcyclopentadienyl-[2,1-b]-pyrrol)-9-($\eta^5$-fluorenyl)-zirconium dichloride and dimethyl;

dimethylsilandiyl-4-(3-ethyl-1-phenylcyclopentadienyl-[2,1-b]-pyrrol)-9-($\eta^5$-fluorenyl)-zirconium dichloride and dimethyl;

dimethylsilandiyl-4-(3-isopropyl-1-phenylcyclopentadienyl-[2,1-b]-pyrrol)-9-($\eta^5$-fluorenyl)-zirconium dichloride and dimethyl;

dimethylsilandiyl-6-(2,5-dimethyl-3-phenylcyclopentadienyl-[1,2-b]-thiophene)zirconium dichloride and dimethyl.

Metallocene compounds of formula (I) and (IV) and their methods of preparation are described in the copending Application PCT/EP00/13191 in the name of the same Applicant.

The first stage of the polymerization (A) can be carried out in liquid phase, or in gas phase, working in one or more reactors. The liquid phase is generally an inert hydrocarbon, such as hexane or toluene, or can be one or more olefins, i.e. a liquid monomer process. The gas-phase polymerization can be carried out in one or more fluidised bed reactors or wherein the bed is agitated mechanically.

The treatment stage (II) can be carried out by contacting the polymer obtained under stage (I) with a solution of the metallocene in a hydrocarbon solvent, such as hexane or toluene optionally in the presence of a suitable cocatalyst and/or an Al-alkyl compound. Preferably said solution contains a suitable cocatalyst, such as an alumoxane, or a compound able to form an alkylmetallocene cation and an Al-alkyl compound used as scavenger.

Examples of alumoxanes suitable for use according to the present invention are methylalumoxane (MAO), isobutylalumoxane (TIBAO) and 2,4,4-trimethyl-pentylalumoxane (TIOAO). The molar ratio between the aluminium and the metal of the metallocene compound is in general comprised from 10:1 to 20000:1, preferably from 100:1 to 5000:1, more preferably from 10:1 to 5000:1, even more preferably from 100:1 to 1000:1.

Non-limiting examples of compounds able to form an alkylmetallocene cation are compounds of the formula $D^+E^-$, wherein $D^+$ is a Broensted acid, able to donate a proton and to react irreversibly with a substituent X of the compound of the formula (I), and $E^-$ is a compatible anion which does not coordinate and which is able to stabilise the active catalytic species which results from the reaction of the two compounds and which is sufficiently labile to be displaceable by an olefin substrate. Preferably, the anion $E^-$ consists of one or more boron atoms. More preferably, the anion $E^-$ is an anion of the formula $BAr_4^{(-)}$, wherein the substituents Ar which can be identical or different are aryl radicals such as phenyl, pentafluorophenyl or bis (trifluoromethyl)phenyl. Tetrakis-pentafluorophenyl borate is particularly preferred. Moreover, compounds of the formula $BAr_3$ can conveniently be used. Compounds of this type are described, for example, in the published International patent application WO 92/00333. Further, compounds of the formula $R^{27}M$—O—$MR^{27}$, $R^{27}$ being an alkyl or aryl group, and M is selected from an element of the Group 13 of the Periodic Table of the Elements (IUPAC). Compounds of this type are described, for example, in the International patent application WO 99/40129. Examples of Al-alkyl compounds are trimethylaluninum (TMA), tris(2,4,4-trimethyl-pentyl)aluminum (TIOA), tris(2-methyl-propyl) aluminum (TIBA), tris(2,3,3-trimethyl-butyl)aluminum, tris (2,3-dimethyl-hexyl)aluminum, tris(2,3-dimethyl-butyl) aluminum, tris(2,3-dimethyl-pentyl)aluminum, tris(2,3-dimethyl-heptyl)aluminum, tris(2-methyl-3-ethyl-pentyl) aluminum and tris(2-ethyl-3,3-dimethyl-butyl).

The treatment stage (II) can be carried out by suspending the polymer obtained in (I) in a hydrocarbon solvent, which contains the metallocene compound of formula (I) and optionally the cocatalyst. The working temperature generally ranges from 0 to 100° C., preferably 10 to 60° C. The solvent can be removed at the end of the treatment. It is also possible to contact the polymer produced under (I) with a solution of the metallocene compound containing a minimum of solvent. When the treatment stage (II) is carried out in a gas phase a loop reactor can be used, wherein the polymer obtained under step (I) is circulated by a stream of inert gas. The loop reactor is fed, for example with a sprayer, with a solution of the metallocene compound optionally containing the cocatalyst, in order to obtain a free-flowing product.

The quantity of the metallocene contained in the product obtained from the treatment stage (II) can vary over a wide range depending on the metallocene used and on the relative amount of product desired in the various stages. Generally, said quantity is from $1 \times 10^{-7}$ to $1 \times 10^{-3}$ g of the metallocene/g of product, preferably from $5 \times 10^{-7}$ to $5 \times 10^{-4}$, more preferably from $1 \times 10^{-6}$ to $1 \times 10^{-4}$.

The deactivation, if any, of the catalyst used in (I) prior to the contact treatment with the metallocene is carried out with a compound that is capable of deactivating the catalyst present in the product obtained in step (I). Preferably the compound capable of deactivating the catalyst is selected from the group consisting of CO, COS, $CS_2$, $CO_2$, $O_2$, acetylenic compounds, allenic compounds and compounds of general formula $R^{28}{}_{y-1}X^3H$ in which $R^{28}$ is hydrogen or a hydrocarbon group with from 1 to 10 carbon atoms, $X^3$ is oxygen, nitrogen or sulphur and y is the valence of X.

Non-limiting examples of compounds for use as a deactivating agent can be found in U.S. Pat. No. 5,648,422, the disclosure of which being incorporated herein by reference.

The polymerization step (III) can be carried out in liquid phase, gas phase or suspension. The liquid phase can be carried out in an inert hydrocarbon solvent or in one or more olefins, i.e liquid monomer process. The gas-phase process can be carried out in a reactor equipped with a fluidised bed or a mechanically stirred bed. During the second polymerization of step (III) it is convenient to feed into the polymerization reactor an Al-alkyl compound as described above and an alumoxane compound, such as methylalumixane. Generally the Al-alkyl compound is fed into the reactor during the polymerization step (III) when the treatment step (II) has been carried out without an Al-alkyl compound.

The amount of polymer produced in stage (I) is generally higher than 2000 g/g of solid component, preferably higher than 3000 g/g of solid component, and more preferably higher than 5000 g/g of solid component.

The catalyst used in the first stage (I) comprises the product obtainable by contact treatment of:
(a) a solid component comprising a compound of a transition metal M selected from Ti or V and not containing a M-π bond, supported on magnesium halide. The solid component can also comprise an electron-donor compound, i.e. an internal donor. Generally, internal donors are used when the solid component is used for the preparation of catalysts for the stereospecific polymerization of alpha-olefins, such as propylene, in order to obtain highly stereospecific polymers having an isotacticity value of higher than 90;

(b) an Al-alkyl compound and optionally an electron donor compound, i.e. an external donor.

The halides of magnesium, preferably $MgCl_2$, in active form, used as support for Ziegler-Natta catalysts are well know and described in, for example, U.S. Pat. Nos. 4,298,718 and 4,495,338.

The compound of the non-metallocene compound is selected from the group consisting of Ti-halides, Ti-haloalkoxides, $VCl_3$, $VCl_4$, $VOCl_3$ and halo alkoxides of V.

When titanium compounds are used, the preferred are $TiCl_4$, $TiCl_3$, and the halo alkoxides of the formula $Ti(OR^{29})_k X_j$, wherein $R^{29}$ is a hydrogen radical with 1–12 carbon atoms or a —$COR^1$ group, X is a halogen and (k+1) is the valence of titanium.

Internal donors are selected from ethers, esters, amines, ketones. Particular useful internal donors are 1,3-diethers, which are described, for instance, in EP-A-361493.

The Al-alkyl compound is generally selected from a trialkylaluminium compound. Non-limiting examples of aluminium compounds are $Al(Me)_3$, $Al(Et)_3$, $AlH(Et)_2$, $Al(iBu)_3$, $AlH(iBu)_2$, $Al(iHex)_3$, $Al(iOct)_3$, $AlH(iOct)_2$, $Al(C_6H_5)_3$, $Al(CH_2$—$CH(Me)CH(Me)_2)_3$, $Al(CH_2C_6H_5)_3$, $Al(CH_2CMe_3)_3$, $Al(CH_2SiMe_3)_3$, $Al(Me)_2iBu$, $Al(Me)_2Et$, $AlMe(Et)_2$, $AlMe(iBu)_2$, $Al(Me)_2iBu$, $Al(Me)_2Cl$, $Al(Et)_2Cl$, $AlEtCl_2$ and $Al_2(Et)_3Cl_3$, wherein Me=methyl, Et=ethyl, iBu=isobutyl, iHex=isohexyl, iOct=2,4,4-trimethyl-pentyl. The above mentioned Al-alkyl compounds can be used either alone or in mixtures thereof.

Amongst the above aluminium compounds, trimethylaluminium (TMA), triisobutylaluminium (TIBAL) and tris(2,4,4-trimethyl-pentyl)aluminium (TIOA) are preferred.

The external donor can be the same as the internal donor, or can be different therefrom. External donors are generally selected from silicon compounds of formula $R^{30}R^{31}Si$ $(OR^{32})_2$, wherein $R^{30}$, $R^{31}$ and $R^{32}$ are a $C_1$–$C_{20}$-alkyl or a $C_6$–$Cl_{12}$-aryl group. Non limiting examples are methylcyclohexyldimethoxysilane and diphenyldimethoxysilane.

The polymer produced in step (I) is an essentially isotactic propylene polymer as defined under component (B) of the composition of the present invention.

The polymer produced in step (III) is a flexible propylene polymer having reduced isotacticity as defined under component (A) of the composition of the present invention.

The compositions according to the present invention can be used as a flexible material and as a compatibilizer for blends of amorphous and crystalline polyolefins.

The thermoplastic compositions of the present invention can also be prepared by mixing the components in generally known mixers, such as a Banbury mixer.

The compositions of the present invention are generally obtained in the form of pellets. These pellets can be converted into articles by generally known processing methods of thermoplastic materials, such as moulding, extrusion, injection and the like. It is a further aspect of the present invention to provide manufactured articles obtainable from a thermoplastic composition of the present invention.

In particular, the manufactured articles according to the present invention obtained by moulding processes are endowed with flexible properties, which are of particular interest for articles for which high deformation and elongation is required.

Films obtained by the thermoplastic compositions of the present invention by extrusion processes are particularly useful in the field of low-temperature-heat-sealing films.

The data of the following examples indicate that the compositions of the present invention, differently from the individual components, have elasto-mechanical properties, which make them particularly useful for the preparation of articles for which high flexibility is required.

The component (A) generally has very high flexibility as it is shown by very low flexural modulus, low strength at yield and high elongation at yield. The component (B) shows very high flexural modulus, high strength at yield and low elongation at yield. These characteristics reflect a much stiffer material, which is unsatisfactory when high flexibility is required.

When an application requires a certain set of flexible-mechanical properties within the limits of the component (A) and (B), it is achievable by modulation of the composition of the present invention. Further, the compositions of the present invention are endowed with good transparency. The compositions of the present invention have a sealing-initiation-temperature (SIT), which is substantially lower than the films obtained from (B) alone.

In particular the composition of the present invention have the following characteristics:

Melt Flow Rate (METHOD ASTM D1238) comprised from 5 to 200

Elongation at break (METHOD ASTM D 412) >600%, preferably >800%;

Flexural modulus (E') (METHOD ASTM D-5023) comprised from 100 Mpa to 1200 Mpa; preferably from 100 to 800;

HAZE (on 1 mm compression moulded plaque METHOD ASTM D1003) comprised from 20% to 50%;

GLOSS (60°) (on 1 mm compression moulded plaque METHOD ASTM 2457) comprised from 50% to 90% and Sealing Initiation Temperature (measured according to the procedure reported in the examples) comprised from 80° C. to 130° C.

The composition of the present invention can be used together with a further polymeric material, such as a crystalline, semicrystalline or rubber like material, in order to obtain a ternary composition.

The present invention is illustrated by means of the following examples, which are given solely for illustrative purposes and are not intended to limit the scope of the invention.

EXAMPLES

General Procedures.

All operations were performed under nitrogen by using conventional Schlenk-line techniques. Solvents were purified by degassing with $N_2$ and passing over activated (8 hours, $N_2$ purge, 300° C.) $Al_2O_3$, and stored under nitrogen. n-BuLi (Aldrich) was used as received.

The proton and carbon spectra of ligands and metallocenes were obtained using a Bruker DPX 200 spectrometer operating in the Fourier transform mode at room temperature at 200.13 MHz and 50.32 MHz respectively. The samples were dissolved in $CDCl_3$ or $CD_2Cl_2$. As reference the residual peak of $CHCl_3$ or $CHDCl_2$, in the $^1H$ spectra (7.25 ppm and 5.35 ppm, respectively) and the middle peak of the solvent in the $^{13}C$ spectra (77.00 ppm for $CDCl_3$) were used. Proton spectra were acquired with a 15° pulse and 2 seconds of delay between pulses; 32 transients were stored for each spectrum. The carbon spectra were acquired with a 45° pulse and 6 seconds of delay between pulses; about 512 transients were stored for each spectrum. All NMR solvents were dried over $P_4O_{10}$, and distilled before use. Preparation of the samples was carried out under nitrogen using standard inert atmosphere techniques.

The proton and carbon spectra of polymers were obtained using a Bruker DPX 400 spectrometer operating in the Fourier transform mode at 120° C. at 400.13 MHz and 100.61 MHz respectively. The samples were dissolved in $C_2D_2Cl_4$. As reference the residual peak of $C_2DHCl_4$ in the $^1H$ spectra (5.95 ppm) and the peak of the mmmm pentad in the $^{13}C$ spectra (21.8 ppm) were used. Proton spectra were acquired with a 45° pulse and 5 seconds of delay between pulses; 256 transients were stored for each spectrum. The carbon spectra were acquired with a 90° pulse and 12 seconds (15 seconds for ethylene based polymers) of delay between pulses and CPD (waltz 16) to remove $^1H$-$^{13}C$ couplings. About 3000 transients were stored for each spectrum.

GC-MS analyses were carried out on a HP 5890-serie 2 gas-chromatograph and a HP 5989B quadrupole mass spectrometer.

The intrinsic viscosity (I.V.) was measured in tetrahydronaphtalene solution (THN) obtained by dissolving the polymer at 135° C. for 1 h.

The melting points of the polymers ($T_m$,) were measured by Differential Scanning Calorimetry (D.S.C.) on an instrument Perkin Elmer DSC-7, according to the following method. The instrument was calibrated with indium and tin standards. Weighted sample (5–10 mg) obtained from the polymerization was sealed into aluminium pans and heated at 200° C. with a scanning speed corresponding to 20° C./minute. The sample was kept at 200° C. for 5 minutes to allow a complete melting of all the crystallites. Successively, after cooling to 0° C. with a scanning speed corresponding to 20° C./minute, the peak temperature was assumed as crystallisation temperature ($T_c$). After standing 5 minutes at 0° C., the sample was heated for the second time at 200° C. with a scanning speed corresponding to 20° C./min. In this second heating run, the peak temperature was assumed as melting temperature ($T_m$) and the area as global melting enthalpy ($\Delta H_f$).

The distribution of molecular weights was determined by GPC carried out on an instrument WATERS 200 in trichlorobenzene (stabilised with BHT, 0.1 wt. %) at 135° C.

A commercial (Witco) 10% toluene solution of methylalumoxane (MAO) was used as received.

The following abbreviations are used.
THF=tetrahydrofuran
$Et_2O$=diethyl ether

The physico-mechanical characterisations were carried out according to the methods indicated below:
flexural modulus (E') ASTM-D 5023
strength at break ASTM-D 412
elongation at break ASTM-D 412
strength at yield ASTM-D 412
elongation at yield ASTM-D 412
haze ASTM-D 1003.

Table 3 indicated the physico-mechanical characterizations of the compositions according to the present invention.

The tension set measurements were performed according to the following procedure. A specimen of length $l_0$ was elongated at a rate of 20 cm/min. It was held under stress for 10 minutes, and thereafter the stress was released at the same rate. The length l of the specimen after 10 minutes at rest was measured. The tension set was calculated as $[(1-l_0)/l_0] \times 100$.

The physico-mechanical measurements listed above were carried out on samples obtained from a plate of 1 mm thickness, prepared by compression moulding under the following conditions: 5 minutes at 200° C. without pressure, than 5 minutes under pressure, and then cooling to 23° C. under pressure with circulating water.

The sealing-initiation-temperature (SIT) is defined as the lowest temperature at which two films must be sealed together in order to achieve a seal strength higher than 0.250 kg/cm². The SIT was determined on films consisting of two layers, namely a top layer of a polymer composition according to the present invention, and a base layer of commercial polypropylene homopolymer. The top layer is sealed along one of the 5 cm sides with a Brugger Feinmechanik Sealer, model HSG-ETK 745. Sealing time is 0.5 seconds at a pressure of 0.1 N/mm². The sealing temperature is increased for each seal, starting from about 70° C. The sealed samples are left to cool and then their unsealed ends are attached t an Instron machine where they are tested as traction speed of 50 mm/min.

The S.I.T. is the minimum sealing temperature as which the seal does not break when a load of at least 2 Newtons is applied in the said test conditions.

Preparation of the Ligand Precursors
Synthesis of chloro(1-indenyl)dimethylsilane

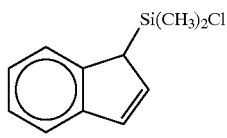

37.5 mL of a 2.5 M solution of n-BuLi in hexane (93.75 mmol, n-BuLi:indene=1.1:1) was added dropwise to a solution of indene (purity 90%, 11 g, 85.23 mmol) in 60 mL of Et₂O, previously cooled to −78° C. At the end of the addition, the yellow slurry was allowed to reach room temperature and stirred for 4 hours to give an orange solution. The solvents were evaporated under reduced pressure to give a yellow solid, which was taken up in 75 mL of hexane; the milky suspension was stirred for few minutes and the lithium salt of indene (white precipitate) was filtered and washed with hexane (3×20 mL). The solid was again slurried in hexane (40 mL) and added to a stirred solution of Me₂SiCl₂ (15.5 mL, 127.84 mmol, Me₂SiCl₂/IndLi=1.5:1) in 50 mL of hexane, previously cooled to −78° C. At the end of the addition, the mixture was allowed to reach room temperature and stirred overnight. The suspension was then filtered, and the filtrate brought to dryness in vacuo to yield a light yellow oil (16.5 g) of (1-Ind)SiMe₂Cl free from its vinylic isomer (yield 89%). The title compound was analysed by ¹H NMR spectroscopy.

Synthesis of chloro(2-Me-1-indenyl)dimethylsilane

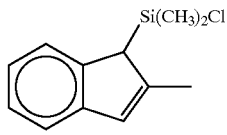

4.56 mL of a 2.5 M solution of n-BuLi in hexane (11.4 mmol) was added dropwise to a solution of 2-methylindene (Boulder Scientific Company, 1.45 g, 11.1 mmol) in 11 mL of Et₂O, previously cooled to −78° C. At the end of the addition, the mixture was allowed to reach room temperature and stirred for 4 hours to give a yellow suspension. The solvents were evaporated under reduced pressure to give a yellow solid, which was taken up in hexane; the milky suspension was stirred for few minutes and the lithium salt of 2-methylindene (white precipitate) was filtered and washed with hexane. The solid was again slurried in hexane and added to a stirred solution of Me₂SiCl₂ (1.85 mL, 16.6 mmol, Me₂SiCl₂/IndLi=1.5:1) in 7 mL of hexane, previously cooled to −78° C. At the end of the addition, the white thick slurry was allowed to reach room temperature and stirred overnight. The suspension was then filtered and the filtrate brought to dryness in vacuo to yield a light yellow oil (1.98 g) of (2-Me-1-Ind)SiMe₂Cl (yield 80%). The title compound was analysed by ¹H NMR spectroscopy.

Synthesis of bis(3,5-dibromo-2-thienyl)methanol (or 3,3',5,5'-tetrabromo-2,2'-dithienyl carbinol)

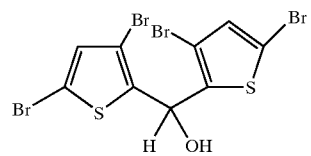

A solution of 31.35 g of 2,3,5-tribromothiophene (Lancaster, 98%, MW=320.84, 95.75 mmol) in 70 mL of ether was cooled to −78° C. and added dropwise of 38.3 mL of a 2.5 M n-BuLi solution in hexane (95.75 mmol). The resulting mixture was allowed to warm up to room temperature, stirred in additional 1 h and then added at 0÷−10° C. to a solution of 3.86 mL of ethylformate (Aldrich, 97%, MW=74.08, d=0.917, 46.35 mmol) in 20 mL of hexane, previously cooled to 0÷−10° C. At the end of the addition (~20 min) the reaction mixture was allowed to warm up to room temperature and then refluxed for 1 h. The resulting mixture was quenched with 7.5 mL of water, the organic layer was separated, dried by magnesium sulfate and the solvents evaporated giving 23.2 g of a light brown solid, which was analysed by ¹H NMR, ¹³C NMR, GC-MS. Purity=93.0%. Isolated yield towards ethylformate=90.9%. The title compound was analysed by ¹H NMR and ¹³C NMR spectroscopy.

Synthesis of 3,3',5,5'-tetrabromo-2,2'-dithienylmethane

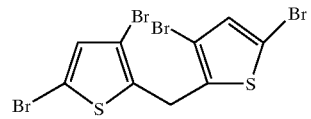

Trifluoroacetic acid (0.25 mL, Aldrich, 99%, MW=114.02, d=1.48, 3.24 mmol) was added at room temperature to a solution of 1.75 g of bis(3,5-dibromo-2-thienyl)methanol (93.0%, MW=511.90, 3.18 mmol) in 15 mL of methylene chloride containing 0.50 mL of triethylsilane (Aldrich, 99%, MW=116.28, d=0.728, 3.13 mmol). The resulting red solution was stirred for 1 h at room temperature, neutralized with solid potassium carbonate (0.4 g, MW=138.21, 2.89 mmol), filtered and evaporated to leave a light red solid. Yield of crude product=100%.

The title compound was analysed by ¹H NMR and ¹³C NMR spectroscopy.

Synthesis of 3,3'-dibromo-5,5'-dimethyl-2,2'-dithienylmethane

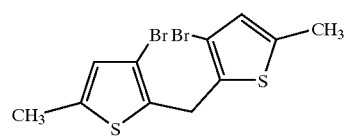

A precooled (−20° C.) 2.5 M solution of n-BuLi in hexane (41.1 mL, 102.75 mmol) was added at −20° C. to a solution of 25.48 g of 3,3',5,5'-tetrabromo-2,2'-dithienylmethane (MW=495.90, 51.38 mmol) in 100 mL of Et₂O. After 30 min stirring at −20° C., a precooled (−20° C.) ethereal (10 mL) solution of dimethyl sulfate (Aldrich, 9.72 mL, MW=126.13, d=1.333, 102.75 mmol) was added. The resulting black suspension was stirred for 45 min at −20° C.; the cooling bath was then removed and the flow of nitrogen stopped. A 4 N solution of sodium hydroxide (2.5 mL, 10 mmol) was added and the mixture vigorously stirred for 2 h at room temperature. The resulting reaction mixture was dried by magnesium sulfate, filtered, the residue on the frit washed twice with ether (to recover all the product) and the filtrate concentrated under reduced pressure at 40° C. for 2 h giving 17.8 g of a brown solid. Purity=87.8% (by GC-MS). Yield of pure product=83.1% (raw yield=94.6%).

The title compound was analysed by $^1$H NMR, $^{13}$C NMR and MS spectroscopy.

Synthesis of 2,5-dimethyl-7H-cyclopenta[1,2-b4,3-b']dithiophene (or 2,5-dimethyl-7H-thieno[3',2':3,4]cyclopenta[b]thiophene)

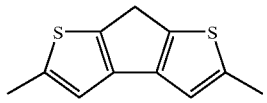

A solution of 0.1 mol of 3,3'-dibromo-5,5'-dimethyl-2,2'-dithienylmethane in 200 mL ether was treated with 0.23 mol of n-BuLi at −70° C. At the end of the addition, the reaction mixture was stirred for additional 30 min at the same temperature. Then 0.265 mol of CuCl$_2$ was added quickly. The resulting mixture was allowed to warm up to room temperature and stirred for 12 h. The final suspension was poured into water, the organic layer was separated and concentrated. The residue was recrystallized from ether. Yield 25%. The title compound was analysed by $^1$H NMR and $^{13}$C NMR spectroscopy.

Preparation of the Ligands

Synthesis of 1-(indenyl)7-(2,5-dimethyl-cyclopenta [1,2-b:4,3-b']-dithiophene) dimethylsilane

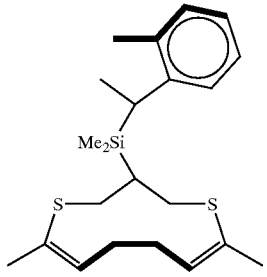

3.13 mL of a 1.6 M solution of n-BuLi (5 mmol) was added at −70° C. to a solution of 1.03 g (5 mmol) of 2,5-dimethyl-7H-cyclopenta[1,2-b:4,3-b']-dithiophene in 20 mL of ether. The resulting mixture was stirred for additional 30 min at 0° C., then cooled again to −70° C. and treated with 1.04 g (5 mmol) of chloro(1-indenyl) dimethylsilane in 10 mL of ether. The reaction mixture was allowed to warm up to room temperature and then treated with a saturated aqueous solution of NH$_4$Cl. The organic phase was isolated and the solvent was removed to give the crude product as an orange oil in 100% yield (1.89 g).

The title compound was characterized by $^1$H-NMR spectroscopy.

Synthesis of (2-methyl-indenyl)-7-(2,5-dimethyl-cyclopenta[1,2-b:4,3-b']-dithiophene) dimethylsilane The procedure for the synthesis of 1-(indenyl)-7-(2,5-dimethyl-cyclopenta [1,2-b:4,3-b']-dithiophene) dimethylsilane described in Example 1 was followed, except that chloro(2-methyl-1-indenyl)dimethylsilane was used instead of chloro(1-indenyl)dimethylsilane.

Preparation of the Metallocenes

Synthesis of dimethylsilyl{(1-indenyl)-7-(2,5-dimethyl-cyclopenta 11,2-b:4,3-b']-dithiophene)} zirconium dichloride [Me$_2$Si(Ind)(7-MeTh$_2$-Cp)ZrCl$_2$]

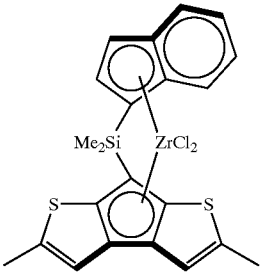

6.25 mL of a 1.6 M n-BuLi (10.0 mmol) solution was added at −70° C. to a solution of 1.89 g (5.0 mmol) of 1-(indenyl)-7-(2,5-dimethyl-cyclopenta[1,2-b:4.3-b']-dithiophene)dimethylsilane in 20 mL of ether. The mixture was allowed to warm up to 0° C. and then was treated with 1.16 g (5.0 mmol) of ZrCl$_4$. The reaction mixture was refluxed under stirring for 3 h and then added of 50 mL of CH$_2$Cl$_2$ at room temperature. The resulting solution was isolated and evaporated. The residue was recrystallized from CH$_2$Cl$_2$/hexane. Yield 0.81 g (30%). The title compound was characterized by $^1$H-NMR spectroscopy.

Synthesis of dimethylsilyl{(2-methyl-1-indenyl)-7-(2,5-dimethyl-cyclopenta [1,2-b:4,3bl]-dithiophene)} zirconium dichloride [Me$_2$Si(2-Me-Ind)(7-MeTh$_2$-Cp)ZrCl$_2$]

The procedure as described above was followed, except that (2-methyl-1-indenyl)-7-(2,5-dimethyl-cyclopenta [1,2-b:4,3-b']-dithiophene)dimethylsilane was used instead of the (indenyl)-7-(2,5-dimethyl-cyclopenta[1,2-b:4,3-b']-dithiophene)dimethylsilane.

Polymerizations

Polymerizations (Homogeneous Conditions)

Polymerization on Supported [Me$_2$Si(Ind)(7-MeTh$_2$-Cp)ZrCl$_2$].

Example 1

Preparation of Component (A)

a) Preparation of the Carrier

A Ziegler-Natta catalyst as described in Example 3 of EP-A-553806, was prepolymerized in a 60 L reactor under the following conditions: T$_p$ 30° C., propane/ethylene 1.5 bar, to obtain a porous PE prepolymer (conversion of 40 g$_{PE}$/g$_{cat}$) with the following properties:

I.V. 21 dL/g Mean Particle size 386 μm Porosity 50.9% V/V (1.07 cc/g)

Since the prepolymer following dischargment is still active the following treatment was necessary, in order to deactivate the Z/N catalytic system. A sample of 650 g was steamed in a fluidized bed reactor (0.1 kg steam/kg polymer, 110° C. for 30 minutes) and then dried in the same reactor under hot nitrogen flow at 125° C. for several hours.

b) Preparation of the Supported Catalyst

The apparatus used for the supportation is a glass cylindrical vessel mechanically stirred in order to allow a good mixing between the carrier and the catalytic solution during the impregnation operation. 3.5 g of the carrier (obtained as described above) were loaded into the vessel and mechanically suspended under nitrogen flow. The catalytic solution was prepared by dissolving 40 mg of [Me$_2$Si(Ind)(7-MeTh$_2$-

Cp)ZrCl$_2$] in 10.5 mL of a MAO solution (WITCO, 100 g/L in toluene). Due to the limited porosity of the carrier the liquid is dropped onto the solid until the incipient wetness condition is reached. At this point the solvent is evaporated under vacuum. All the operations are carried out at room temperature. The catalytic solution is then added to the carrier step by step. After dosing the whole catalytic solution, additional 3 mL of MAO solution were added to improve the performances of the final supported catalyst. The final catalyst appears as a pink-violet free flowing solid. Final composition: 0.14% Zr, 13% Al, Al/Zr ca. 300.

c) Polymerizations.

The polymerizations were carried out in a 4.25 L reactor (purified as described above), using the following procedure: under a propylene flow, 1 mmol of Al(i-Bu)$_3$ (as a 1M solution in hexane) and an amount of propylene corresponding to a volume of 2.5 L were charged at the polymerization temperature. The temperature is raised to 30° C., the supported catalyst is injected with nitrogen overpressure through the pressure vial, the vial is then rinsed with 5 mL of hexane into the reactor, and the reactor is brought to the polymerization temperature in 3–10 min. The polymerization is then carried out for 120 min.

The results are reported in Table 1.

The mechanical characteristics are indicated in Table 3.

Examples 2 to 9

Step I)

Isotactic polypropylene used as component (B) was prepared by using the catalyst described in example 3 of EP 395083 the polymerization was carried out according the general procedure for propylene polymerization described in the same documents. Isotactic polypropylene having the following characteristics was obtained:

I.V.=1.49
$\overline{M}_w$=193,700; $\overline{M}_w/\overline{M}_n$=9.88
XSRT=3.5% wt
Poured density=0.341 g/mL
T$_m$=163° C.; ΔH=102 J/g
Porosity (Hg)=0.538 mL/g.

The mechanical characteristics are indicated in Table 3

Step (II)

The carrier was deactivated in air and then dried under reduced pressure at 70° C. for 2 hours. The apparatus used for the impregnation is a glass cylindrical vessel mechanically stirred in order to allow good mixing between the carrier and the catalytic solution during the impregnation operation. An amount of the polymer obtained under step (I) indicated in Table 2 was loaded into the vessel and mechanically suspended under nitrogen flow. The catalytic solution was prepared by dissolving the amount and type of metallocene and the amount of methylalumoxane (MAO WITCO, 100 g/L in toluene) indicated in Table 2. At this point the solvent is evaporated under vacuum. All of the operations are carried out at room temperature. The catalytic solution is then added to the carrier step by step. After dosing the whole catalytic solution, an additional 3 mL of MAO solution were added to improve the performance of the final supported catalyst.

Step (III)

As catalysts either [Me$_2$Si(Ind)(7-MeTh$_2$-Cp)ZrCl$_2$] or [Me$_2$Si(2-Me-Ind)(7-MeTh$_2$Cp)ZrCl$_2$] were used. The catalyst/cocatalyst mixture was prepared as described above. The polymerizations were carried out in a 4.25 L reactor (purified as described above), using the following procedure:

The amount of carrier specified in Table 2 was charged in the reactor under a propane flow, then propane was added, then 1 mmol of Al(i-Bu)$_3$ (as a 1M solution in hexane) and after 5 min the catalyst/cocatalyst mixture in toluene, the temperature was brought to 40° C. for 10 min then propane is flashed out down to ambient pressure (the temperature decreases to 25° C.). In 2–3 minutes the desired amount of propylene is added to achieve the pressure required for the prepolymerization step, then, after the desired time, additional propylene is pressurized into the reactor for the second step (see Table 2 for amounts and time) until achieving the desired pressure for polymerizing in gas phase or in liquid phase (see table 2). After venting the unreacted monomer and cooling the reactor to room temperature, the polymer was dried under reduced pressure at 60° C.

The polymerization data and the characteristics of the thermoplastic composition according to the present invention are indicated in Table 2.

The characteristics of the compositions of Examples 5, 6 and 9 are indicated in Table 3.

TABLE 1

| | | | | | | | Activity | | | | |
|---|---|---|---|---|---|---|---|---|---|---|---|
| Ex. | Metallocene | Supp. Cat. mg | Propylene g | T$_p$ ° C. | Time Min | Yield g PP | kg$_{pp}$/g$_{metallocene}$ (kg$_{pp}$/g$_{cat}$) | I.V. dL/g | T$_m$ ° C. | Triads mm % | ΔH J/g |
| 1 | Me$_2$Si(Ind)(7-MeTh$_2$-Cp)ZrCl$_2$ | 243(4) | 1243 | 50 | 120 | 395 | 204(1.6) | 1.55 | 1.08 | 78 | 49 | flexible polypropylene (component (A))

TABLE 2

| | | | | | | Polymerization | | | | | | | | | | | | Split wt % |
|---|---|---|---|---|---|---|---|---|---|---|---|---|---|---|---|---|---|---|
| | Car- | | | | Pre-poly | gas ph. | pro- | Pro- | | P | | Activity | | | | DSC | | PP |
| Ex. | rier g | Metallocene | mg | Al/Zr | T ° C. | P$_{C3}$ Bar | cess type | pene g | T ° C. | bar- g | Time min | Kg-PP/g | I.V. dl/g | Mw x 10$^3$ | M$_w$/M$_n$ | Tm (I) ° C. | Tm (II) ° C. | ΔH (J/g) | from MCN |
| 2 | 80 | Me$_2$Si(Ind)(7-MeTh$_2$- | 10 | 500 | | | 1) | 82 | 60 | 10 | 85 | 19 | 0.77 | 107 | 6.50 | n.d | n.d | n.d | 70 |

TABLE 2-continued

| | | | | | Polymerization | | | | | | | | | | | DSC | | | Split wt % PP |
|---|---|---|---|---|---|---|---|---|---|---|---|---|---|---|---|---|---|---|---|
| Ex. | Carrier g | Metallocene | mg | Al/Zr | Pre-poly T °C. | gas ph. $P_{C3}$ Bar | pro-cess type | Pro-pene g | T °C. | P bar-g | Time min | Activity Kg-PP/g | I.V. dl/g | Mw x $10^3$ | $M_w/M_n$ | Tm (I) °C. | Tm (II) °C. | ΔH (J/g) | from MCN |
| 3 | 84 | $Me_2Si(Ind)$ (7-$MeTh_2$-Cp) $ZrCl_2$ | 7 | 500 | 50 | 9 | 2) | 1032 | 50 | 20 | 60 | 50 | 1.34 | 203 | 2.69 | 99.22 | 160.73 | 32.4 | 81 |
| 4 | 42 | $Me_2Si(Ind)$ (7-$MeTh_2$-Cp) $ZrCl_2$ | 7 | 500 | 30 | 4 | 2) | 1438 | 50 | 20 | 30 | 96 | 1.35 | 212 | 2.45 | 106.16 | n.d. | n.d. | 94 |
| 5 | 100 | $Me_2Si(Ind)$ (7-$MeTh_2$-Cp) $ZrCl_2$ | 6 | 500 | 50 | 9 | 2) | 1032 | 50 | 20 | 38 | 56 | 1.49 | 243 | 2.45 | 109.09 | 163.99 | 32.4 | 77 |
| 6 | 300 | $Me_2Si(Ind)$ (7-$MeTh_2$-Cp) $ZrCl_2$ | 7 | 500 | 50 | 9 | 2) | 1438 | 50 | 20 | 40 | 47 | 1.49 | 260 | 4.52 | 112.99 | 162.20 | 20.7 | 52 |
| 7 | 80 | $Me_2Si(2-Meind)$ (7-$MeTh_2$-Cp)$ZrCl_2$ | 4 | 500 | | | 1) | 77 | 50 | 10 | 120 | 21 | 1.34 | 250 | 6.29 | n.d | 163.31 | n.d. | 52 |
| 8 | 70 | $Me_2Si(2-Meind)$ (7-$MeTh_2$-Cp)$ZrCl_2$ | 5 | 400 | 50 | 9 | 2) | 1438 | 50 | 20 | 99 | 34 | n.d. | n.d. | n.d. | 101.53 | 162.82 | n.d. | 71 |
| 9 | 71 | $Me_2Si(2-Meind)$ (7-$MeTh_2$-Cp)$ZrCl_2$ | 5 | 400 | | | 1) | 1438 | 50 | 10 | 120 | 85 | 1.08 | n.d. | n.d. | n.d. | n.d. | n.d. | 86 |

1) Gas phase
2) Liq. Phase
MCN: metallocene

TABLE 3

| Description | Units | Ex 4 | Ex 6 | EX 9 | Ex 1 | component B Ex 2-9 step (I) |
|---|---|---|---|---|---|---|
| Melt Flow Rate | g/10' | — | — | 22.9 | — | — |
| HAZE on 1 mm compresion moulded plague | % | — | — | 33 | — | — |
| GLOSS (60°) HAZE on 1 mm compresion moulded plague | % | — | — | 61 | — | — |
| Yield Strength | MPa | 15 | 23 | 12.2 | 13 | 38 |
| Elongation at yield | % | 15 | 14 | 18.3 | 18 | 10 |
| Strength at break | MPa | 31 | 33 | 26 | 32 | — |
| Elongation at break | % | 680 | 670 | >880 | 610 | — |
| Flexural Modulus | MPa | 284 | 621 | 300 | 251 | 1800 |
| Sealing Initiation Temperature on BOPP | °C. | 95 | — | — | — | — |

What is claimed is:

1. A thermoplastic composition comprising:
   (A) 10 to 99% by weight of a propylene polymer optionally containing from 0.1 to 5% by moles of units derived from an olefin of the formula $CH_2$=CHR, R being selected from the group consisting of hydrogen, a $C_2$–$C_{20}$-alkyl and a $C_6$–$C_{12}$-aryl group, having the following characteristics:
   50<isotactic triads (mm)<85;
   melting point (Tm) from 80° C. to 120° C., and
   (B) 1 to 90% by weight of a propylene polymer optionally containing from 0.1 to 5% by moles of units derived from an olefin of the formula $CH_2$=CHR, R being selected from the group consisting of hydrogen, a $C_2$–$C_{20}$-alkyl and a $C_6$–$C_{12}$-aryl group, which has the following characteristics:
   an essentially isotactic structure;
   melting point (Tm) higher than 153° C.

2. The thermoplastic composition according to claim 1, wherein the ratio of the quantities by weight of the components (A)/(B) is from 30:70 to 95:5.

3. The thermoplastic composition according to claim 1, wherein said propylene polymer of component (B) has a melting point (Tm) higher than 155° C.

4. The thermoplastic composition according to claim 1, wherein the component (A) is a propylene polymer having intrinsic viscosity values [η] of higher than 0.5.

5. The thermoplastic composition according to claim 1, wherein in the propylene polymer of component (A) the isotactic triads (mm) satisfy the relation 60<isotactic triads (mm)<80.

6. The thermoplastic composition according to claim 1, wherein the component (B) is a propylene polymer, which shows the following characteristics:
   melting enthalpy>70 J/g, and
   % of isotactic triads mm (B)>% of isotactic triads mm (A).

7. The thermoplastic composition according to claim 1, wherein the component (B) is a propylene homopolymer having a percentage of isotactic triads (mm) of higher than 90.

8. The thermoplastic composition according to claim 7, wherein the component (B) is a propylene homopolymer having a percentage of isotactic triads (mm) of higher than 95.

9. The thermoplastic composition according to claim 1, wherein the component (B) is a propylene polymer having the following characteristics:
   melting point of higher than 160° C.; [η]>1 dl/g.

10. The thermoplastic composition according to claim 1, wherein the propylene polymer of component (A) has a value of the ratio $M_w/M_n$ lower than 3.

11. The thermoplastic composition according to claim 1, wherein the component (A) is a polymer having a melting enthalpy<70 J/g.

12. A process for the preparation of a thermoplastic composition according to claim 1, comprising the steps of:
   (I) polymerizing propylene optionally with an olefin of the formula $CH_2=CHR$, R being selected from the group consisting of hydrogen, a $C_1$–$C_{20}$-alkyl and a $C_6$–$C_{12}$-aryl group, in one or more reactors, in the presence of a catalyst comprising the reaction product of an Al-alkyl compound and a solid component comprising at least one non-metallocene compound of a transition metal $M^1$ containing Ti and not containing $M^1$-π bonds, and a magnesium halide;
   (II) deactivating the catalyst used under (I) and contacting the product as obtained under step (I) with at least one of
   (A) a metallocene compound of the general formula (I):

$$L^1Z^1G^1M^2X^1{}_p \qquad (I)$$

wherein $L^1$ is a divalent bridging group;
   $Z^1$ is a moiety of formula (II):

(II)

wherein $R^2$ and $R^3$ are the same or different and are selected from the group consisting of hydrogen, a $C_1$–$C_{20}$-alkyl, $C_3$–$C_{20}$-cycloalkyl, $C_2$–$C_{20}$-alkenyl, $C_6$–$C_{20}$-aryl, $C_7$–$C_{20}$-alkylaryl, and a $C_7$–$C_{20}$-arylalkyl radical, optionally containing heteroatoms belonging to groups 13–17 of the Periodic Table of the Elements, at least one of $R^2$ and $R^3$ being different from hydrogen;
A and B are selected from S, O and $CR^4$, wherein $R^4$ is selected from the group consisting of hydrogen, a $C_1$–$C_{20}$-alkyl, $C_3$–$C_{20}$-cycloalkyl, $C_2$–$C_{20}$-alkenyl, $C_6$–$C_{20}$-aryl, $C_7$–$C_{20}$-alkylaryl, and a $C_7$–$C_{20}$-arylalkyl radical, optionally containing heteroatoms belonging to groups 13–17 of the Periodic Table of the Elements, either A or B being different from $CR^5$, and wherein the rings containing A and B have a double bond in the allowed position;
$G^1$ is a moiety of formula (III):

(III)

wherein $R^5$, $R^6$ and $R^8$ are the same or different and are selected from the group consisting of hydrogen, a $C_1$–$C_{20}$-alkyl, $C_3$–$C_{20}$-cycloalkyl, $C_2$–$C_{20}$-alkenyl, $C_6$–$C_{20}$-aryl, $C_7$–$C_{20}$-alkylaryl, and a $C_7$–$C_{20}$-arylalkyl radical, optionally containing heteroatoms belonging to groups 13–17 of the Periodic Table of the Elements, and $R^5$ and $R^6$ can form a ring comprising from 3 to 8 atoms, which can bear substituents;
$M^2$ is an atom of a transition metal selected from those belonging to group 3, 4, 5, 6, the lanthanide and the actinide groups in the Periodic Table of the Elements (IUPAC);
$X^1$ is the same or different and is selected from the group consisting of hydrogen, a halogen atom, a $R^9$, $OR^9$, $OSO_2CF_3$, $OCOR^9$, $SR^9$, $NR^9{}_2$ and a $PR^9{}_2$ group, wherein the substituents $R^9$ are selected from the group consisting of hydrogen, a $C_1$–$C_{20}$-alkyl, $C_3$–$C_{20}$-cycloalkyl, $C_2$–$C_{20}$-alkenyl, $C_6$–$C_{20}$-aryl, $C_7$–$C_{20}$-alkylaryl, and a $C_7$–$C_{20}$-arylalkyl radical, optionally containing heteroatoms;
p is an integer from 0 to 3, equal to the oxidation state of the metal M minus 2; and
(A') a metallocene compound of the general formula (IV):

$$L^2G^2Z^2M^3X^2{}_q \qquad (IV)$$

wherein
$L^2$ is a divalent bridging group;
$G^2$ is a moiety of formula (V):

(V)

wherein the ring substituted with $R^{11}$ and $R^{10}$ groups have double bonds in any of the allowed positions;
$R^{10}$ and $R^{11}$ are the same or different from each other and are selected from the group consisting of hydrogen, a $C_1$–$C_{20}$-alkyl, $C_3$–$C_{20}$-cycloalkyl, $C_2$–$C_{20}$-alkenyl, $C_6$–$C_{20}$-aryl, $C_7$–$C_{20}$-alkylaryl, and a $C_7$–$C_{20}$-arylalkyl radical, optionally containing heteroatoms; wherein substituents selected from (a) two $R^{10}$ (b) $R^{11}$ and (c) two $R^{10}$ and $R^{11}$, can form a ring comprising 4 to 8 atoms, which can bear substituents;
e and f are the same or different from each other and are integers from 1 to 6; and $Z^2$ is selected from the group consisting of
(i) a moiety of formula (VI):

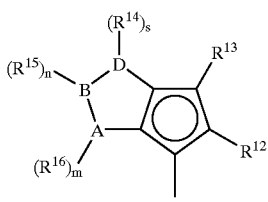

(VI)

wherein
A, B and D are the same or different from each other and are selected from an element of the groups 13 to 16 of the Periodic Table of the Elements (IUPAC);

$R^{12}$, $R^{13}$, $R^{14}$, $R^{15}$ and $R^{16}$ are the same or different from each other and are selected from the group consisting of hydrogen, a $C_1$–$C_{20}$-alkyl, $C_3$–$C_{20}$-cycloalkyl, $C_2$–$C_{20}$-alkenyl, $C_6$–$C_{20}$-aryl, $C_7$–$C_{20}$-alkylaryl, and a $C_7$–$C_{20}$-arylalkyl radical, optionally containing heteroatoms; wherein two $R^{14}$ can form a ring comprising 4 to 8 atoms, and any of two adjacent $R^{14}$, $R^{15}$ and $R^{16}$ can form a ring comprising 4 to 8 atoms, which can bear substituents;

n, m and s are integers from 0 to 2;

n, m and s being 0 when A, B and D are selected from an element of group 16 of the Periodic Table of the Elements (IUPAC);

n, m and s being 1 when A, B and D are selected from an element of groups 13 and 15 of the Periodic Table of the Elements (IUPAC);

n, m and s being 1 or 2 when A, B and D are selected from an element of group 14 of the Periodic Table of the Elements (IUPAC);

and wherein the ring containing A, B and D can have double bonds in any of the allowed positions; and
(ii) a moiety of formula (VII):

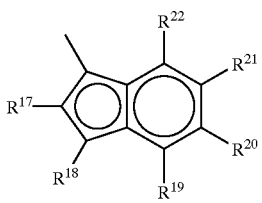

(VII)

wherein
$R^{17}$, $R^{18}$, $R^{19}$, $R^{20}$, $R^{21}$ and $R^{22}$ are the same or different from each other and are selected from the group consisting of hydrogen, a $C_1$–$C_{20}$-alkyl, $C_3$–$C_{20}$-cycloalkyl, $C_2$–$C_{20}$-alkenyl, $C_6$–$C_{20}$-aryl, $C_7$–$C_{20}$-alkylaryl, $C_7$–$C_{20}$-arylalkyl radical, optionally containing heteroatoms, and optionally any of two adjacent $R^{19}$, $R^{20}$, $R^{21}$ and $R^{22}$ can form a ring comprising 4 to 8 atoms which can bear substituents;

$M^3$ is an atom of a transition metal selected from those belonging to group 3,4,5,6, the lanthanide group and the actinide groups in the Periodic Table of the (IUPAC)

$X^2$ is the same or different and is selected from the group consisting of a hydrogen atom, a halogen atom, a $R^{23}$, $OR^{23}$, $OSO_2CF_3$, $OCOR^{23}$, $SR^{23}$, $NR^{23}_2$ and a $PR^{23}_2$ group, wherein the sub substituents $R^{23}$ are selected from the group consisting of hydrogen, a $C_1$–$C_{20}$-alkyl, $C_3$–$C_{20}$-cycloalkyl, $C_2$–$C_{20}$-alkenyl, $C_6$–$C_{20}$-aryl, $C_7$–$C_{20}$-alkylaryl, and a $C_7$–$C_{20}$-arylalkyl radical, optionally containing heteroatoms; q is an integer from 0 to 3, and is equal to the oxidation state of the metal M minus 2;

and optionally with
(B) at least one of a suitable cocatalyst and an Al-alkyl compound and
(III) polymerizing propylene optionally with one or more of an olefin of the formula $CH_2=CHR$, R being selected from the group consisting of hydrogen, a $C_1$–$C_{20}$-alkyl and a $C_6$–$C_{12}$-aryl group, in one or more reactors, in the presence of the product obtained in step (II).

13. The process according to claim 12, wherein in the metallocene the transition metals $M^2$ and $M^3$ are selected from titanium, zirconium and hafnium.

14. The process according to claim 12, wherein formulae (I) and (IV), the substituents $X^1$ and $X^2$ are chlorine atoms or methyl groups.

15. The process according to claim 12, wherein the bridging groups $L^1$ and $L^2$ are a $=CMe_2$ or $=SiMe_2$ group.

16. The process according to claim 12, wherein in the metallocenes of formula (I), one of A and B is a sulfur atom and the other is a CH group.

17. The process according to claim 12, wherein $R^2$ and $R^3$ are the same and are a $C_1$–$C_{20}$-alkyl group, which can contain a silicon atom.

18. The process according to claim 12, wherein in the metallocene compound of formula (I),
$G^1$ is a moiety of formula (IIIa):

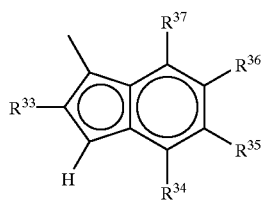

(IIIa)

wherein $R^{33}$, $R^{34}$ $R^{35}$, $R^{36}$ and $R^{37}$ are the same or different from each other and are selected from the group consisting of hydrogen, a $C_1$–$C_{20}$-alkyl, $C_3$–$C_{20}$-cycloalkyl, $C_2$–$C_{20}$-alkenyl, $C_6$–$C_{20}$-aryl, $C_7$–$C_{20}$-alkylaryl, and a $C_7$–$C_{20}$-arylalkyl radical, optionally containing heteroatoms, and optionally any of two adjacent $R^{34}$, $R^{35}$, $R^{36}$ and $R^{37}$ can form a ring comprising 4 to 8 atoms which can bear substituents.

19. The process according to claim 18 wherein $R^{33}$ is $C_1$–$C_{20}$-alkyl; $R^{37}$ is selected from the group consisting of $C_1$–$C_{20}$-alkyl, $C_6$–$C_{20}$-aryl and a condensed benzene ring formed with $R^{36}$.

20. The process according to claim 18, wherein dimethylsilandiyl-1-(2-methyl-indenyl)-7-(2,5-dimethylcyclopentadienyl dithiophene)zirconium dichloride and dimethyl and dimethylsilandiyl-1-(indenyl)-7-(2,5-dimethylcyclopentadienyl dithiophene)zirconium dichloride and dimethyl are used.

21. The process according to claim 12, wherein $G^2$ in the metallocene of the formula (IV) is a fluorenyl or substituted fluorenyl radical.

22. The process according to claim 12, wherein in the moiety of formula (VI) $R^{12}$ is a $C_1$–$C_{20}$-alkyl radical, $R^{14}$ is a $C_6$–$C_{20}$-aryl radical, $R^{13}$, $R^{15}$ and $R^{16}$ are hydrogen, A and B are carbon atoms and D is nitrogen.

23. The process according to claim 12, wherein in the moiety of formula (VII) $R^{19}$ and $R^{20}$ form a ring comprising 6 carbon atoms.

24. A manufactured article comprising the thermoplastic composition according to claim 1.

25. A process for the preparation of a thermoplastic composition according to claim 1, comprising the steps of:

(I) polymerizing propylene optionally with an olefin of the formula $CH_2=CHR$, R being selected from the group consisting of hydrogen, a $C_1$–$C_{20}$-alkyl and a $C_6$–$C_{12}$-aryl group, in one or more reactors, in the presence of a catalyst comprising the reaction product of an Al-alkyl compound and a solid component comprising at least one non-metallocene compound of a transition metal $M^1$ containing Ti and not containing $M^1$-π bonds, and a magnesium halide; and (II) contacting the product as obtained under step (I) with at least one of (A) a metallocene compound of the general formula (I):

$$L^1Z^1G^1M^2X^1p \qquad (I)$$

wherein $L^1$ is a divalent bridging group;
$Z^1$ is a moiety of formula (II):

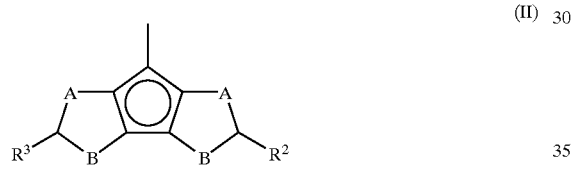

(II)

wherein $R^2$ and $R^3$ are the same or different and are selected from the group consisting of hydrogen, a $C_1$–$C_{20}$-alkyl, $C_3$–$C_{20}$-cycloalkyl, $C_2$–$C_{20}$-alkenyl, $C_6$–$C_{20}$-aryl, $C_7$–$C_{20}$-alkylaryl, and a $C_7$–$C_{20}$-arylalkyl radical, optionally containing heteroatoms belonging to groups 13–17 of the Periodic Table of the Elements, at least one of $R^2$ and $R^3$ being different from hydrogen;

A and B are selected from S, O and $CR^4$ wherein $R^4$ is selected from the group consisting of hydrogen, a $C_1$–$C_{20}$-alkyl, $C_3$–$C_{20}$-cycloalkyl, $C_2$–$C_{20}$-alkenyl, $C_6$–$C_{20}$-aryl, $C_7$–$C_{20}$-alkylaryl, and a $C_7$–$C_{20}$-arylalkyl radical, optionally containing heteroatoms belonging to groups 13–17 of the Periodic Table of the Elements, either A or B being different from $CR^5$, and wherein the rings containing A and B have a double bond in the allowed position;

$G^1$ is a moiety of formula (III):

(III)

wherein $R^5$, $R^6$ and $R^8$ are the same or different and are selected from the group consisting of hydrogen, a $C_1$–$C_{20}$-alkyl, $C_3$–$C_{20}$-cycloalkyl, $C_2$–$C_{20}$-alkenyl, $C_6$–$C_{20}$-aryl, $C_7$–$C_{20}$-alkylaryl, and a $C_7$–$C_{20}$-arylalkyl radical, optionally containing heteroatoms belonging to groups 13–17 of the Periodic Table of the Elements, and $R^5$ and $R^6$ can form a ring comprising from 3 to 8 atoms, which can bear substituents;

$M^2$ is an atom of a transition metal selected from those belonging to group 3, 4, 5, 6, the lanthanide and the actinide groups in the Periodic Table of the Elements (IUPAC);

$X^1$ is the same or different and is selected from the group consisting of hydrogen, a halogen atom, a $R^9$, $OR^9$, $OSO_2CF_3$, $OCOR^9$, $SR^9$, $NR^9_2$ and a group, wherein the substituents $R^9$ are selected from the group consisting of hydrogen, a $C_1$–$C_{20}$-alkyl, $C_3$–$C_{20}$-cycloalkyl, $C_2$–$C_{20}$-alkenyl, $C_6$–$C_{20}$-aryl, $C_7$–$C_{20}$-alkylaryl, and a $C_7$–$C_{20}$-arylalkyl radical, optionally containing heteroatoms;

p is an integer from 0 to 3, equal to the oxidation state of the metal M minus 2; and (A') a metallocene compound of the general formula (IV):

$$L^2G^2Z^2M^3X^2q \qquad (IV)$$

wherein
$L^2$ is a divalent bridging group;
$G^2$ is a moiety of formula (V):

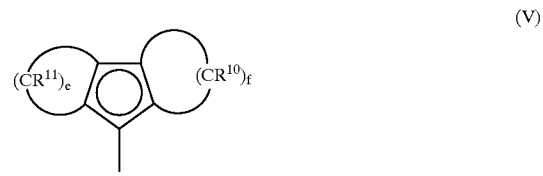

(V)

wherein the ring substituted with $R^{11}$ and $R^{10}$ groups have double bonds in any of the allowed positions;

$R^{10}$ and $R^{11}$ are the same or different from each other and are selected from the group consisting of hydrogen, a $C_1$–$C_{20}$-alkyl, $C_3$–$C_{20}$-cycloalkyl, $C_2$–$C_{20}$-alkenyl, $C_6$–$C_{20}$-aryl, $C_7$–$C_{20}$-alkylaryl, and a $C_7$–$C_{20}$-arylalkyl radical, optionally containing hetero atoms; wherein substituents selected from (a) two $R^{10}$ (b) $R^{11}$ and (c) two $R^{10}$ and $R^{11}$, can form a ring comprising 4 to 8 atoms, which can bear substituents;

e and f are the same or different from each other and are integers from 1 to 6; and $Z^2$ is selected from the group consisting of
(i) a moiety of formula (VI):

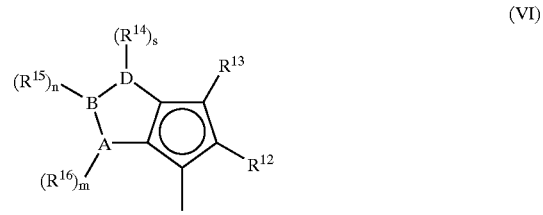

(VI)

wherein
A, B and D are the same or different from each other and are selected from an element of the groups 13 to 16 of the Periodic Table of the Elements (IUPAC);

$R^{12}$, $R^{13}$, $R^{14}$, $R^{15}$ and $R^{16}$ are the same or different from each other and are selected from the group consisting of hydrogen, a $C_1$–$C_{20}$-alkyl, $C_3$–$C_{20}$-cycloalkyl, $C_2$–$C_{20}$-alkenyl, $C_6$–$C_{20}$-aryl, $C_7$–$C_{20}$-alkylaryl, and a $C_7$–$C_{20}$-arylalkyl radical, optionally containing heteroatoms; wherein two $R^{14}$ can form a ring comprising 4 to 8 atoms, and any of two adjacent $R^{14}$, $R^{15}$ and $R^{16}$ can form a ring comprising 4 to 8 atoms, which can bear substituents;

n, m and s are integers from 0 to 2;

n, m and s being 0 when A, B and D are selected from an element of group 16 of the Periodic Table of the Elements (IUPAC);

n, m and s being 1 when A, B and D are selected from an element of groups 13 and 15 of the Periodic Table of the Elements (IUPAC);

n, m and s being 1 or 2 when A, B and D are selected from an element of group 14 of the Periodic Table of the Elements (IUPAC);

and wherein the ring containing A, B and D can have double bonds in any of the allowed positions; and (ii) a moiety of formula (VII):

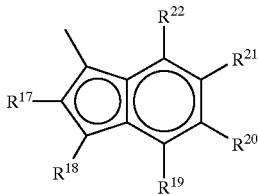

(VII)

wherein
$R^{17}$, $R^{18}$, $R^{19}$, $R^{20}$, $R^{21}$ and $R^{22}$ are the same or different from each other and are selected from the group consisting of hydrogen, a $C_1$–$C_{20}$-alkyl, $C_3$–$C_{20}$-cycloalkyl, $C_2$–$C_{20}$-alkenyl, $C_6$–$C_{20}$-aryl, $C_7$–$C_{20}$-alkylaryl, $C_7$–$C_{20}$-arylalkyl radical, optionally containing heteroatoms, and optionally any of two adjacent $R^{19}$, $R^{20}$, $R^{21}$ and $R^{22}$ can form a ring comprising 4 to 8 atoms which can bear substituents;

$M^3$ is an atom of a transition metal selected from those belonging to group 3,4,5,6, the lanthanide group and the actinide groups in the Periodic Table of the Elements (IUPAC);

$X^2$ is the same or different and is selected from the group consisting of a hydrogen atom, a halogen atom, a $R^{23}$, $OR^{23}$, $OSO_2CF_3$, $OCOR^{23}$, $SR^{23}$, $NR^{23}_2$ and a $PR^{23}_2$ group, wherein the sub substituents $R^{23}$ are selected from the group consisting of hydrogen, a $C_1$–$C_{20}$-alkyl, $C_3$–$C_{20}$-cycloalkyl, $C_2$–$C_{20}$-alkenyl, $C_6$–$C_{20}$-aryl, $C_7$–$C_{20}$-alkylaryl, and a $C_7$–$C_{20}$-arylalkyl radical, optionally containing heteroatoms;

q is an integer from 0 to 3, and is equal to the oxidation state of the metal M minus 2;

and optionally with (B) at least one of a suitable cocatalyst and an Al-alkyl compound and (III) polymerizing propylene optionally with one or more of an olefin of the formula $CH_2$=CHR, R being selected from the group consisting of hydrogen, a $C_1$–$C_{20}$-alkyl and a $C_6$–$C_{12}$-aryl group, in one or more reactors, in the presence of the product obtained in step (II).

* * * * *